Sept. 23, 1941.  W. A. CHARBONNEAUX  2,256,938
ELECTRICAL GENERATION POWER PLANT OF THE START-STOP TYPE
Filed Jan. 31, 1941  4 Sheets-Sheet 1
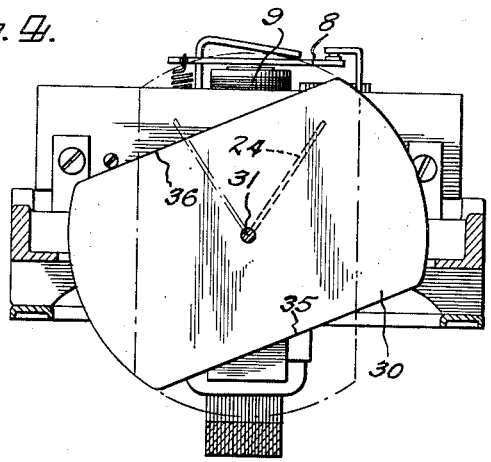
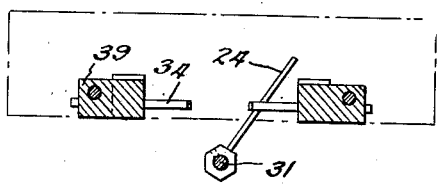
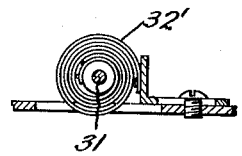
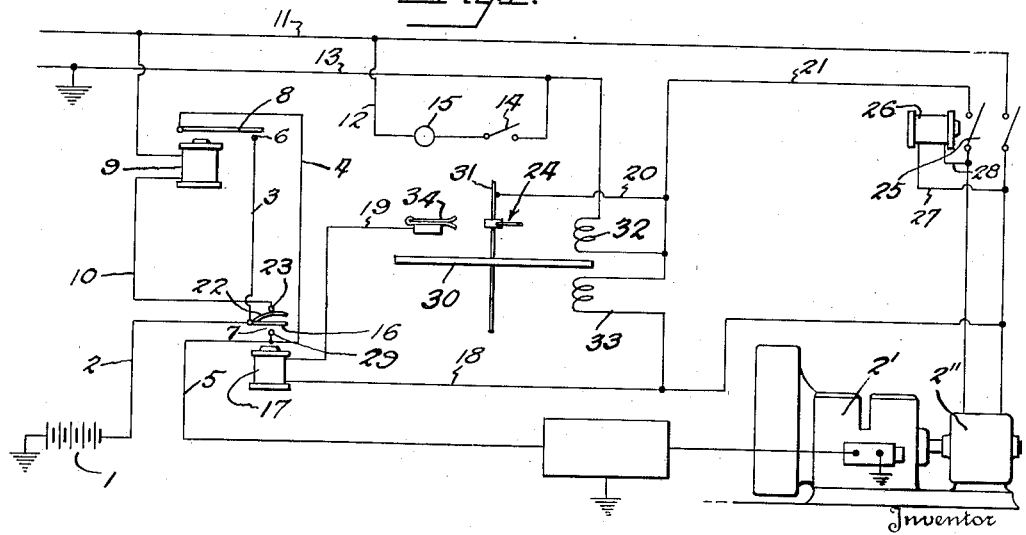
Inventor
W. A. Charbonneaux
By Mason Fenwick & Lawrence
Attorneys Sept. 23, 1941.   W. A. CHARBONNEAUX   2,256,938
ELECTRICAL GENERATION POWER PLANT OF THE START-STOP TYPE
Filed Jan. 31, 1941   4 Sheets-Sheet 2
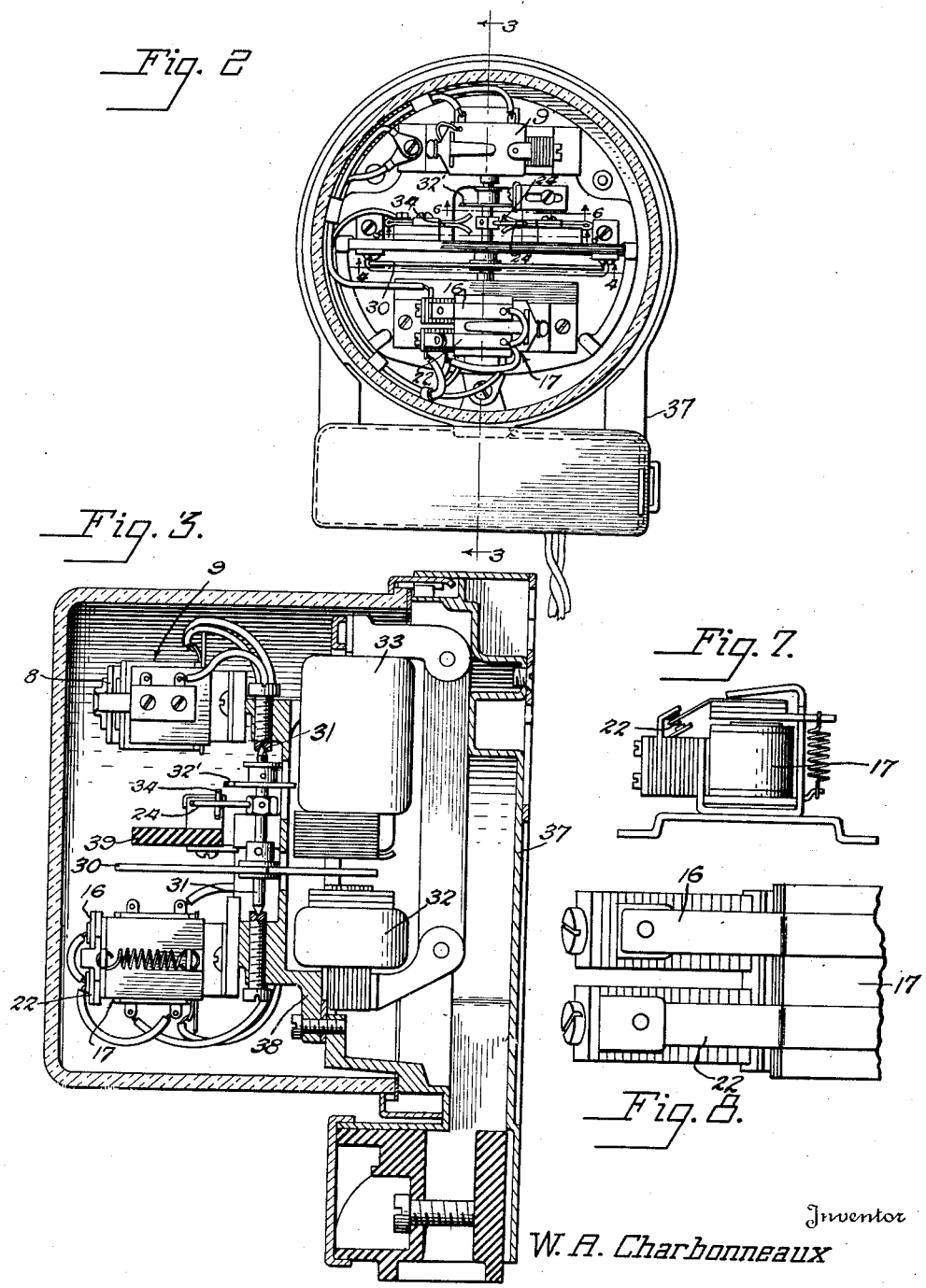

Sept. 23, 1941.  W. A. CHARBONNEAUX  2,256,938
ELECTRICAL GENERATION POWER PLANT OF THE START-STOP TYPE
Filed Jan. 31, 1941  4 Sheets-Sheet 3

Inventor
W. A. Charbonneaux

By Mason Fenwick & Lawrence
Attorneys

Patented Sept. 23, 1941

2,256,938

UNITED STATES PATENT OFFICE 2,256,938

ELECTRICAL GENERATION POWER PLANT OF THE START-STOP TYPE

Wilson A. Charbonneaux, Burlington, Iowa

Application January 31, 1941, Serial No. 376,894

13 Claims. (Cl. 290—30)

This invention relates to electrical generation plants of that type which includes an internal combustion engine and a generator driven thereby, which operates responsive to the cutting in of a load upon the generator lines and ceases to operate when said load is cut out.

Inasmuch as the objects of the present invention involve certain instrumentalities placed at strategic points in a circuit system, such system, much of which is conventional, will be first described prior to a relation of the objects of the subject invention.

In the drawings which accompany and form a part of the following specification, and throughout which the same characters of reference have been employed to designate identical elements:

Figure 1 is a diagrammatic layout of the circuit system of a power plant of the type indicated, including certain instrumentalities embodying the principles of the subject invention;

Figure 2 is a plan view of the inductive switch unit showing appertinent structure;

Figure 3 is a vertical section through the inductive switch unit;

Figure 4 is a horizontal section through the inductive switch unit illustrating in particular, the rotary switch support;

Figure 5 is a horizontal sectional view of the fixed and movable elements of the inductive switch;

Figure 6 is a fragmentary detail view taken in a plane perpendicular to the axis of rotation of the inductive switch illustrating the return spring;

Figure 7 is a view in elevation illustrating the solenoid switch which shifts the battery from the starting to the ignition branch circuit and closes the gap in the latter circuit;

Figure 8 is a plan view of the armature blades of the solenoid switch shown in Figure 7;

Figure 12:
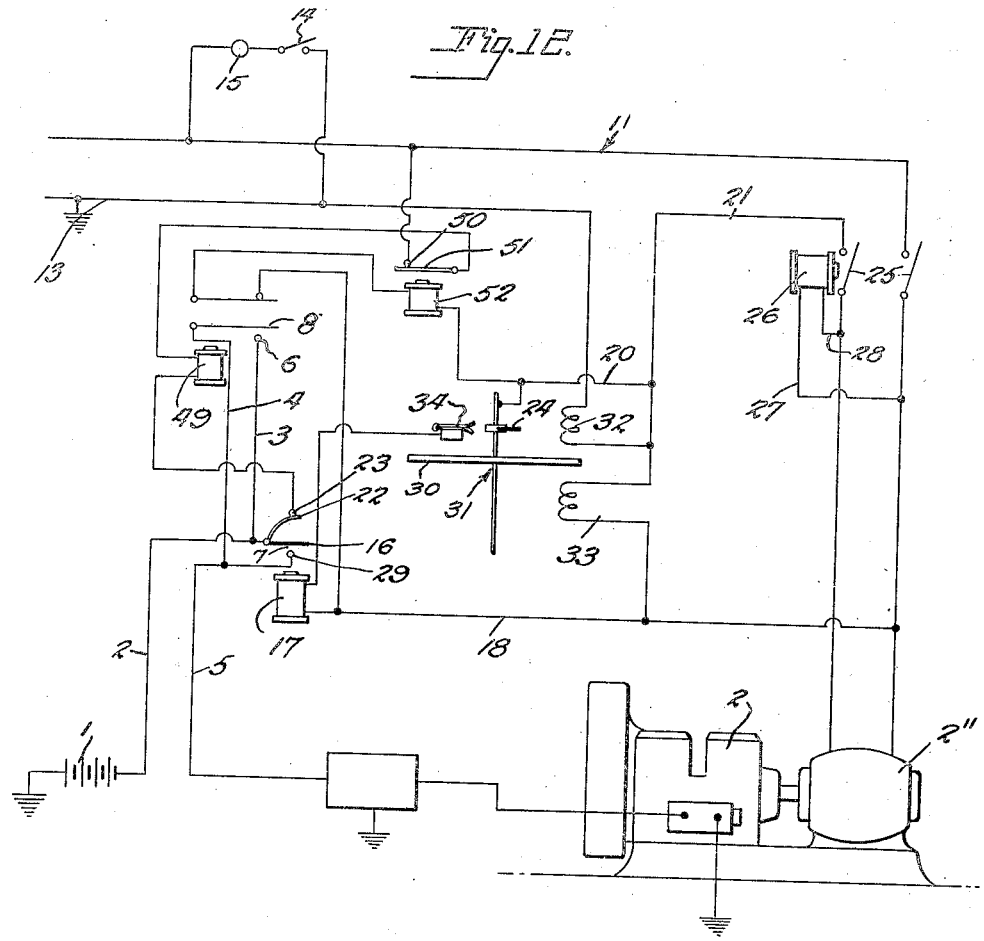
Figure 12 is a circuit layout similar to that shown in Figure 1, excepting that it shows alternative means to the slow acting solenoid in the primary activating circuit for inhibiting the re-energization of said solenoid by the current generated through inertia operation of the generator after the load switch has been cut off.
Figure 9:
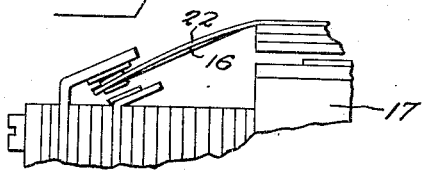
Figures 9, 10 and 11 are fragmentary views in elevation showing the armature blades in different operative positions.
Figure 10:
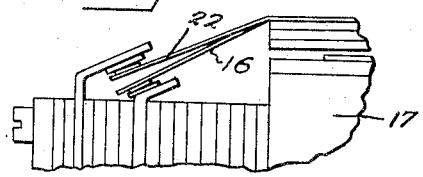
Figure 11:
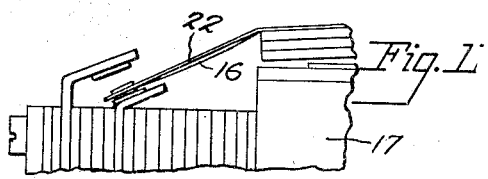

Referring now to the diagrammatic circuit arrangement shown in Figure 1, it will be understood that the conventional power plant of the type described may include a storage battery 1, for operating the starter of the internal combustion engine 2', and furnishing ignition to said engine throughout its period of operation, said battery being in circuit with the starting and ignition controls of the internal combustion engine through the alternately employed circuits 2, 3, 4, 5, and 2, 5, having the respective gaps at 6 and 7, which gaps are open during the inactive periods of the power plant, so that the battery is, during such periods, electrically isolated from the prime mover.

The circuit 2, 3, 4, 5, initially energized upon cutting in the load, operates the starter as well as supplies ignition to the internal combustion engine, while the alternative circuit 2, 5, to which the battery is shifted after starting of the internal combustion engine, merely supplies ignition to the prime mover. The means by which the starter is automatically cut out when the internal combustion engine starts is well known in the art, and not here shown.

The gap 6 in the starting circuit 2, 3, 4, 5, is closed by a solenoid switch 8, the coil 9 of which is in a primary activating circuit 2, 10, 11, 12, 13, which includes the battery, and load switch 14, which latter, in series with the load 15, is connected in parallel across the generator lines.

The gap 7 in the ignition circuit 2, 5, is closed by a solenoid switch 16, the coil 17 of which is in circuit with the generator lines through the wires 18, 19, 20, and 21, which switch 16 acts, simultaneously with the closing of the gap 7, to shift the battery from the starting circuit to the ignition circuit by moving the armature blade 22 away from the contact 23.

The circuit which energizes the coil 17 is closed by a switch 24 which responds, in closing, to the generated current, and it opens immediately upon the opening of the load switch 14. The significance of this distinction between the opening and closing factors to which this switch responds is that the generator will continue to generate current a little while after the opening of the load switch through inertia, and it is desired that the opening of the switch 24 be simultaneous with the opening of the load switch 14 without waiting for the generator to run down.

The conventional circuit system in this type of power plant may include also a normally open double throw switch 25 which is closed by a solenoid 26 in a circuit 27, 28, arranged in parallel across the generator lines on the side of said double throw switch toward the generator, the object of the double throw switch being to keep the generator lines open until the generator has accelerated to capacity speed.

The operation of a conventional power plant of the type described is as follows. It being assumed that the various instrumentalities are in the position as shown in Figure 1, and that the internal combustion engine is not operating, the load switch 14 is closed, putting the load 15, which for example may be an electric lamp, in circuit across the then inert lines of the generator. The closing of the load switch 14 closes a circuit from the battery 1 through the wires 2, 10, 11, 12, the lamp 15, load switch 14, line 13 to ground. The closing of this primary activating circuit energizes the coil 9, drawing down the switch 8, closing the gap 6, and closing the battery circuit 2, 3, 4, 5, to the starter of the prime mover and to the ignition device thereof. The prime mover starts, rotating the generator 2″. At this time the generator circuit is open through the double throw switch 25, excepting that part which passes through the solenoid 26. When the prime mover starts, the starter is automatically cut out, and the prime mover runs through ignition current supplied from the battery through the circuit 2, 3, 4, 5, while the generator picks up speed. When the speed of the generator is such that the solenoid 26 is sufficiently energized to close the double throw switch 25, line current from the generator is supplied to the parallel circuit including the closed load switch 14, lighting the lamp. The lamp circuit, as has been shown, is also part of the primary activating circuit, so that the generated current passes back through the wire 11, coil 9, wire 10, wire 2, through the battery and to ground, which if it continued for any length of time would seriously discharge the battery. Consequently, it is provided to break the primary activating circuit as soon as possible after the load circuit has been energized. This is accomplished by means of the switch 24 which is closed by the generated current which energizes the coil 17, drawing down the switch 16, opening the primary activating circuit at the terminal 23 and shifting the battery to the circuit 2, 5, continuing the supply of ignition current to the prime mover.

Later on, when the load switch 14 is opened to extinguish the lamp 15, the switch 24 opens, deenergizing the coil 17, which permits the switch 16 to restore the gap 7, breaking the battery circuit 2, 5, to the ignition of the prime mover and restoring the battery to the circuit 2, 3, 4, 5. However, when the primary activating circuit was broken by the opening of the load switch 14, the coil 9 was de-energized, restoring the gap 6 to the circuit 2, 3, 4, 5, so that both circuits between the battery and prime mover are open and the ignition of the prime mover ceases to operate. The generator, however, continues to rotate under inertia at a rapidly decelerating speed, so that when the generated current reaches a sufficiently low voltage, the energization of the solenoid 26 becomes too feeble to hold the double throw switch 25 and the latter opens, restoring the generator lines to their original condition, awaiting a subsequent operation of the power plant.

The conventional system has several defects which it is the object of the present invention to eliminate.

In the first place, the shifting of the switch 16 from the terminal 23 to the terminal 29 breaks the circuit 2, 3, 4, 5, an instant prior to the closing of the circuit 2, 5, so that during this instant the battery is unconnected from the ignition system of the prime mover and there is a chance that the prime mover will stop. One of the objects of the present invention is to provide a delayed action between the closing of the circuit 2, 5, and the opening of the circuit 2, 3, 4, 5. This is accomplished by having the switch 16 formed with an additional spring blade 22 which presses against the contact 23 until the switch 16 has made contact with the terminal 29. At the moment the switch 16 makes contact with the terminal 29, the spring blade 22 breaks contact with the terminal 23. By means of this delayed action switch, the supply of ignition current from the battery 1 to the prime mover 2 is uninterrupted.

The delayed action switch as shown and described is merely exemplary of any other form of delayed action by which the supply of current from the battery to the ignition system of the prime mover is maintained continuous throughout the shifting of the battery from the circuit 2, 3, 4, 5, to the circuit 2, 5.

In the second place, in the conventional systems, the coil 9 of the solenoid switch 8 is of the quick acting type which is immediately energized by the passage of current through the prime activating circuit, so as to immediately close the switch 8 of the battery starting circuit 2, 3, 4, 5. With such a coil, when the switch 24 is opened upon the opening of the load switch 14, to cut off ignition to the prime mover 2, current is still passing through the generator lines, due to the inertia operation of the generator, which current passing back through the primary activating circuit will re-energize the coil 9, drawing down the switch 8, closing the gap 6, and re-establishing the battery circuit to the prime mover through the starting circuit 2, 3, 4, 5, restarting the engine.

The present invention contemplates the substitution of a slow acting coil 9, which will not instantly become energized, and will therefore, not close the gap 6, keeping the battery starting circuit 2, 3, 4, 5, open until the prime mover and generator have come to rest.

In the third place, the switch 24 in the conventional systems is generally operated by a solenoid which is not sensitive, and requires quite an appreciable current to operate it. It is highly desirable, however, in a switch to be used in a circuit of this type, for the switch to be supersensitive, yet able to withstand considerable loading.

One of the objects of the present invention, therefore, is to provide a switch of the inductive type, and specifically a switch of the disc type operating under the differential induction of a potential and current coil. The present invention, therefore, proposes the substitution for a solenoid, of the disc 30 mounted upon a vertical shaft 31 between the current coil 32 and the potential coil 33. The current coil 32 is in series with the load switch and load, and therefore, when the load switch is opened the current coil is at once completely de-energized so that the disc 30 ceases to rotate. Said disc is returned to normal open position of the switch 24 by means of the delicate spiral spring 32′. A switch of this type will rotate to closed position when as low as a 1-watt load is put on the line, and will withstand loads up to and beyond 30,000 watts, if required to do so. The terminal 34 with which the switch 24 makes contact when closed, is preferably a bifurcated spring with which the switch 24 makes wiping contact in coming to rest between the bifurcations of said contact. In view of the fact that the rotative torque of a switch of this type is extremely small, the parts may be made delicate.

In Figure 4 I have shown a slight modification of the disc rotor of the switch 24, in which provision is made to avoid any build-up of torque upon closing of the switch. In this form of the invention the disc 30 is cut off, forming the flat sides 35 and 36, reducing the area of the rotor which is in inductive relation to the coils 32 and 33, and therefore, diminishing the closing torque upon closure of the switch.

I have found that the salient features of the subject invention which I have above described, namely, the slow acting coil 9, the delayed action switch 16, and the inductive-disc operated switch 24 may be conveniently and efficiently assembled as a unit by converting a conventional watt-hour meter. Figures 2, 3, and 4 show such a conversion, in which it will be noted that the base 37, the chassis 38, the current and potential coils 32 and 33, the disc 30 and its trunnion bearings, remain unchanged. In converting such a unit to the purpose of the present invention, it is merely necessary to provide the slow acting coil 9 with its switch armature 8 and the solenoid 17 with the compound armature constituted by the switch 16 and the delayed action spring blade 22. With respect to the disc 30, it is required only to secure to the shaft thereof the switch arm 24, and to provide a suitably secured installation block 39 on which to mount the bifurcated switch terminal 34. The main parts of this unit being already manufactured in great quantities for meter use, can be obtained at relatively small cost, which can be put to commercial advantage in the manufacture and assemblage of the power plant of the subject invention.

Figure 13:
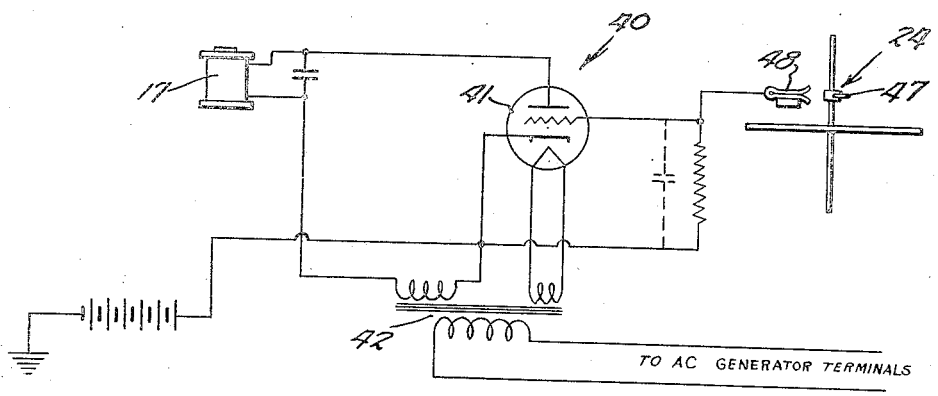
Figure 13 is an alternative arrangement in which a thermionic valve is employed to reduce the current in the contacts of the inductive switch.

In that form of the invention illustrated in Figure 13, a portion of the operative circuit is shown in which an electronic amplifier, which in general is designated by the reference character 40 is intercalated between the inductively operated switch 24 and the coil 17. This amplifier includes the vacuum tube 41 with the operating transformer 42 therefor, the purpose of the vacuum tube being to pick up a very small current from the switch 24 for operating the coil 17. In this manner it is possible to use extremely delicate contacts for the switch 24, so as to impose the minimum mechanical burden on the rotating disc 30 which operates the switch 24. The employment of this thermionic amplifier should be extremely useful in small power plants of the order of 25 kilowatts capacity. Under the arrangement, as shown, it is preferable to use a tube with zero bias and to have the contacts 47 and 48 normally closed, so that the coil 17 operates when the switch 24 opens.

Figure 14:
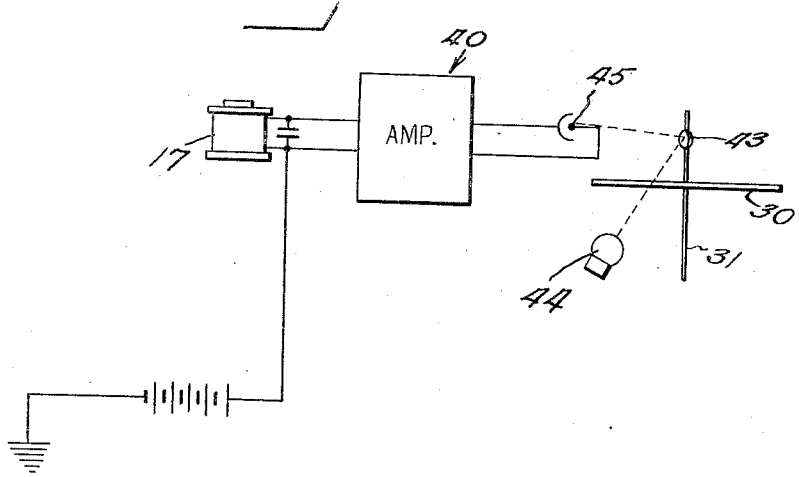
Figure 14 is a modification in which a light beam and a photoelectric cell take the place of the mechanical contacts of the inductive switch.

Figure 14 shows still another modification of the invention, in which in addition to the amplifier 40 the mechanical burden of the inductively operated disc 30 is further reduced by the substitution of photoelectric means in place of the switch contacts for operating the coil 17. In this form of the invention the axis 31 of the disc 30 carries a small mirror 43 which reflects a beam from a suitably located light source 44 upon a photoelectric cell 45 in circuit with the amplifier.

In lieu of the slow acting solenoid 9, I may employ other means for preventing reactivation of the starting circuit through the generation of current by the inertia rotation of the generator after opening of the load switch 14. One of such means is shown in Figure 12, in which the solenoid 49 is of the conventional quick acting type and inherently susceptible of being reenergized by the inertia generated current.

To prevent such an event, the activating circuit is provided with an additional gap 50 closed by a switch 51 during battery energization of the starting circuit but held open by generated current whilever the generated current is strong enough to hold the switch 25 closed.

The switch 51 is controlled by a solenoid 52 in a circuit connected across the generator lines, one limb at least of which is connected to the said generator beyond the switch 25.

It will be clear to those skilled in the art that the invention is susceptible of a number of modifications, and that applicant is not to be limited by the specific embodiments shown herein. Such changes as may be required to adapt the disc switch to operation by direct current or polyphase current will be obvious to one so skilled. The disclosure is, therefore, to be regarded as by way of example, and not as limiting the scope of the invention which is to be determined by the terms of the appended claims.

What I claim as my invention is:

1. In a load responsive stop-start electrical system for power plants of the type comprising an internal combustion engine with generator driven thereby and engine starting and ignition instrumentalities, a battery shiftable between alternate circuits, one being a starting circuit for supplying energy to the starter and initial ignition, the other being an ignition circuit for supplying ignition while the generator is generating, a solenoid actuated shift switch for shifting said battery from one of said circuits to the other, said switch being normally in a position which places said battery in said starting circuit, a normally open solenoid switch in said starting circuit, an activating circuit including said battery, a load, a load switch, and the solenoid of the solenoid switch in said starting circuit, said load and load switch being in parallel across the generator lines, said activating circuit being closed by closing of said load switch, and a generator circuit including the solenoid of said shift switch, said generator circuit including an inductively operated switch closing responsive to generated current for energizing said shift switch solenoid.

2. In a load responsive stop-start electrical system as claimed in claim 1, said inductively operated switch including a movable element comprising a disc rotatable inductively between current and voltage coils in circuit with said generator, and a switch arm rotatable with said disc cooperable with a fixed contact, said disc being spring-returned to repose position, one of said coils being in circuit with said load switch.

3. In a load responsive stop-start electrical system as claimed in claim 1, said inductively operated switch including a movable element comprising a disc rotatable inductively between current and voltage coils in circuit with said generator, and a switch arm rotatable with said disc cooperable with a fixed contact, said disc being spring-returned to repose position, said current coil being in circuit with said load switch.

4. In a load responsive stop-start electrical system as claimed in claim 1, said inductively operated switch including a movable element comprising a disc rotatable inductively between current and voltage coils in circuit with said generator, a switch arm rotatable with said disc, and a cooperating fixed switch element comprising a bifurcated contact yieldingly receiving said switch arm in the closing position of said arm, said disc being spring-returned to repose position, said current coil being in circuit with said load switch.

5. In a load responsive stop-start electrical system as claimed in claim 1, said inductively operated switch including a movable element comprising a disc rotatable inductively between current and voltage coils in circuit with said generator, a switch arm carried by said disc and rotatable therewith, a cooperating fixed switch element comprising a bifurcated contact yieldingly receiving said switch arm in the closing position of said arm, said disc being spring-returned to repose position, and a bifurcated stop member in the opposite end of the arc of rotation of said switch arm for yieldingly receiving said switch arm in its open position, said current coil being in circuit wth said load switch.

6. In a load responsive stop-start electrical system as claimed in claim 1, said generator circuit including a thermionic amplifier intercalated between said shift switch solenoid and said inductively operated switch, with its input end connected to said switch.

7. In a load responsive stop-start electrical system as claimed in claim 1, said inductively operated switch including a movable element comprising a disc rotatable inductively between current and voltage coils in circuit with said generator, a switch arm carried by said disc and rotatable therewith cooperable with a fixed contact, said disc being spring-returned to repose position, said current coil being in circuit with said load switch, and a thermionic amplifier intercalated in the shift switch solenoid circuit having its input end connected to the fixed contact of said inductively operated switch.

8. In a load responsive stop-start electrical system as claimed in claim 1, said inductively operated switch including a movable element comprising a flat metallic member rotatable between current and voltage coils in circuit with said generator, shaped to interpose minimum area in the inductive field between said coils when said member is in switch closing position, to minimize the torque while the switch is closed, and a switch arm rotatable with said member cooperable with a fixed contact, said member being spring-returned to repose position, said current coil being in circuit with said load switch.

9. In a load responsive stop-start electrical system as claimed in claim 1, said inductively operated switch including a movable element comprising a disc rotatable inductively between current and voltage coils in circuit with said generator, a fixed source of light, a photoelectric cell, a mirror carried by said disc and rotatable therewith for reflecting a beam from said light source upon said photoelectric cell, and a thermionic amplifier intercalated in the circuit between said photoelectric cell and shift switch solenoid having its input in circuit with said photoelectric cell.

10. In a load responsive stop-start electrical system for power plants of the type comprising an internal combustion engine with generator driven thereby and engine starting and ignition instrumentalities, a battery shiftable between alternate circuits, one being a starting circuit for supplying energy to the starter and initial ignition, the other being an ignition circuit for supplying ignition while the generator is generating, a solenoid actuated shift switch for shifting said battery from one of said circuits to the other, said switch being normally in a position which places said battery in said starting circuit, a normally open solenoid switch in said starting circuit, an activating circuit including said battery, a load, a load switch, and the solenoid of the solenoid switch in said starting circuit, said load and load switch being in parallel across the generator lines, said activating circuit being closed by closing of said load switch, and a generator circuit including the solenoid of said shift switch, said generator circuit including a switch closing responsive to generated current for energizing said shift switch solenoid, the solenoid of the normally open switch in said starting circuit being of the slow acting type to prevent its re-energization by inertia generated current after the load switch has been opened, with consequent risk of reactivation of the starting circuit.

11. In a load responsive stop-start electrical system for power plants of the type comprising an internal combustion engine with generator driven thereby and engine starting and ignition instrumentalities, a battery shiftable between alternate circuits, one being a starting circuit for supplying energy to the starter and initial ignition, the other being an ignition circuit for supplying ignition while the generator is generating, a solenoid actuated shift switch for shifting said battery from one of said circuits to the other, said switch being normally in a position which places said battery in said starting circuit, a normally open solenoid switch in said starting circuit, an activating circuit including said battery, a load, a load switch, and the solenoid of the solenoid switch in said starting circuit, said load and load switch being in parallel across the generator lines, said activating circuit being closed by closing of said load switch, and a generator circuit including the solenoid of said shift switch, said generator circuit including a switch closing responsive to generated current for energizing said shift switch solenoid, and means to prevent re-energization of the solenoid of the normally open switch in said starting circuit by inertia generated current after the load switch has been opened with consequent risk of reactivation of the starting circuit.

12. In a load responsive stop-start electrical system for power plants of the type comprising an internal combustion engine with generator driven thereby and engine starting and ignition instrumentalities, a battery shiftable between alternate circuits one being a starting circuit for supplying energy to the starter and initial ignition, the other being an ignition circuit for supplying ignition while the generator is generating, a solenoid actuated shift switch for shifting said battery from one of said circuits to the other, said switch being normally in a position which places said battery in said starting circuit, and being constructed to close the ignition circuit before breaking the starting circuit whereby there will be no interruption of the ignition incident to the shift, a normally open solenoid switch in said starting circuit, an activating circuit including said battery, a load, a load switch, and the solenoid switch in said starting circuit, said load and load switch being in parallel across the generator lines, said activating circuit being closed by closing of said load switch, and a generator circuit including the solenoid of said shift switch, said generator circuit including a switch closing responsive to generated current for energizing said shift switch solenoid.

13. In a load responsive stop-start electrical system for power plants of the type comprising an internal combustion engine with generator driven thereby and engine starting and ignition instrumentalities, a battery shiftable between alternate circuits, one being a starting circuit for supplying energy to the starter and initial ignition, the other being an ignition circuit for supplying ignition while the generator is generating, a solenoid actuated shift switch for shifting said battery from one of said circuits to the other, said switch being normally in a position which places said battery in said starting circuit, said switch having differentially acting armature blades, one of which closes said ignition circuit prior to the breaking of the starting circuit by the other blade whereby there will be no interruption of ignition incident to the shift, a normally open solenoid switch in said starting circuit, an activating circuit including said battery, a load, a load switch, and the solenoid of the solenoid switch in said starting circuit, said load and load switch being in parallel across the generator lines, said activating circuit being closed by closing of said load switch, and a generator circuit including the solenoid of said shift switch, said generator circuit including a switch closing responsive to generated current for energizing said shift switch solenoid.

WILSON A. CHARBONNEAUX.